Nov. 18, 1930. C. C. SHAW 1,781,736
WARP BEAM LOCK
Filed Jan. 11, 1928

Inventor
Claude C. Shaw
By Davis & Davis
Attorneys

Patented Nov. 18, 1930

1,781,736

UNITED STATES PATENT OFFICE

CLAUDE C. SHAW, OF CAMDEN, SOUTH CAROLINA

WARP-BEAM LOCK

Application filed January 11, 1928. Serial No. 245,877.

The object of this invention is to provide a beam-lock which can be quickly operated and will be durable and inexpensive in construction and which also will effectively secure the gudgeon or beam shaft against fore-and-aft vibration, to thus insure a high quality of weave.

In the drawing—

Figure 1:
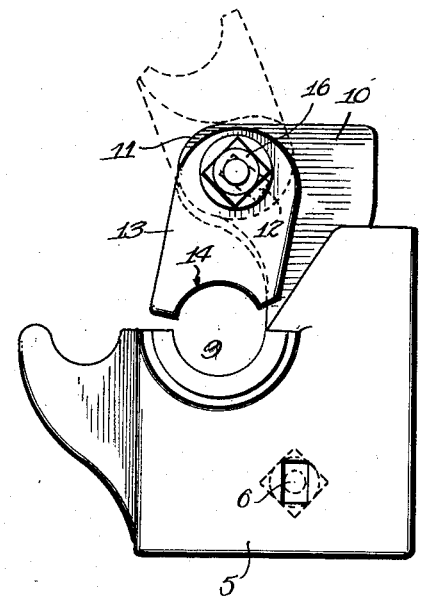
Fig. 1 is an outside elevation of a right-hand device.
Figure 2:
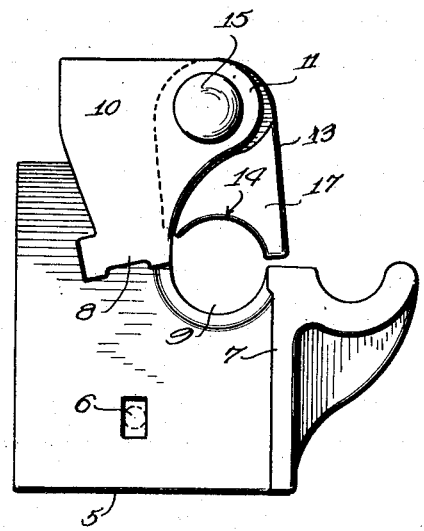
Fig. 2 is an inside elevation of the same.

In the drawing annexed, 5 designates a metal bracket plate adapted to be attached to the loom-frame. In the present instance, the rigid connection of this bracket-plate to the loom-frame is insured by means of a bolt-hole 6 and laterally-projecting lugs 7 and 8. In the top edge of the bracket-plate there is formed a semishaft-bearing 9 which opens upwardly, and rising from the back edge of the plate is an upstanding standard 10 whose forward end 11 overhangs the bearing 9.

Figures 3, 4:
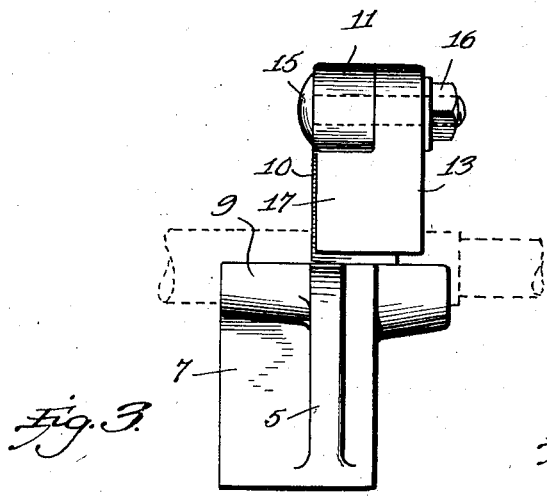
Fig. 3 is an edge elevation of the same.
Fig. 4 is a perspective view of the locking element detached.

Fastened to the overhanging member 10—11 is the locking element 13 which consists of a bar having its lower end curved at 14 to form the upper half of the shaft or gudgeon bearing. This bar 14 is secured to the upstanding plate 10 by means of a bolt 15 which passes through a suitable hole in the plate 10 and through a slot 12 in bar 14 and is provided with a clamp-nut 16, said slot inclining downwardly and forwardly. When the bar 13 is clamped against the outer face of the plate 10 by means of said bolt, the curved part 14 rests upon the gudgeon or shaft and locks the same in the semibearing 9. When the beam is to be removed from the bearings, the nut 16 is loosened and the lock-bar 13 is thrown upwardly and backwardly to a position out of the way, whereupon the beam may be readily lifted off the bearings 9. In replacing the beam after the ends of the shaft are deposited in the bearings 9, the lock-bars 13 are swung down into a snug fit against the shaft and the nuts 16 are then tightened up to lock the same in position. As the shaft and the bearings wear, the slot 12 permits the locking-bar to be slid downwardly and backwardly to compensate for such wear. It is desirable that the bracket-plate shall be fastened on the inner side of the loom-frame so that the bearings 9 will lie in position to receive the larger diameter of the gudgeon or shaft and thus insure the minimum of wearing. To give as broad a bearing as possible for the shaft, the bearing 9 is extended inwardly and outwardly, as shown in Fig. 3. It will be observed that by reason of the overhanging arrangement of the locking-bar, the tendency always is to gravitate toward the shaft, and the angle of the slot 12 insures the locking-bar moving forwardly as well as downwardly, to thus press the shaft in the direction of the pull on the warp yarns, so that fore-and-aft vibration of the beam is rendered impossible even should the nut 16 be accidentally loosened. By thus eliminating fore-and-aft vibration of the gudgeon, the operation of weaving is greatly improved, as is obvious.

To increase the bearing-surface against the upper side of the shaft, I enlarge the bar 13 laterally, as at 17, this enlargement or lug lying under the laterally-projecting extension 11 of the standard 10. This lateral lug 17 has the further advantage that when the locking-bar is thrown upwardly and backwardly, it rests upon the top edge of the standard 10 and thus holds the locking-bar out of the way, as shown in dotted lines in Fig. 1, while the beam is being taken off the brackets or being replaced thereon.

The device I have illustrated herein is adapted for most types of looms, but some types will require slight modifications in order to adapt the invention to them; consequently, I reserve the right to vary the detail construction of the parts without departing from the protection of my patent.

What I claim as new is:

1. In a device of the class set forth, a bracket adapted for attachment to the loom-frame having a shaft-receiving semibearing in its upper edge and also an upstanding standard at its rear edge, behind said bearing, and a locking-bar clamped to said standard by means of a bolt extending through said standard and a slot in said locking-bar, said slot inclining downwardly and forwardly, said locking-bar being provided with a semi-bearing at its lower edge adapted to fit down on the top side of the shaft, said locking-bar being also provided with a lug extending laterally under the projecting end of said standard.

2. In a device of the class set forth, a bracket adapted for attachment to a loom-frame having a gudgeon-receiving semibearing in its upper edge and also an upstanding standard at its rear edge, behind said bearing, this standard being provided at its upper end with a forwardly-projecting part, and a locking-bar clamped to one side face of said forwardly-projecting part in position to hang down over the gudgeon, the lower end of said locking-bar being curved to form a bearing to fit against the upper side of said gudgeon, said locking-bar being provided with a lug or enlargement extending laterally under the aforesaid forwardly projecting part of the standard and having its lower edge curved similarly to the curved lower edge of the locking-bar proper.

In testimony whereof I hereunto affix my signature.

CLAUDE C. SHAW.